United States Patent Office 3,733,406
Patented May 15, 1973

3,733,406
USE OF N-α-DIALKOXYPHOSPHINOTHIOACETYL-N-METHYLCARBAMATES OF PHENOLS AS INSECTICIDES AND ACARICIDES
Albert H. Haubein, Newark, Del., assignor to Hercules Incorporated, Wilmington, Del.
No Drawing. Division of application Ser. No. 743,322, July 9, 1968, now Patent No. 3,600,471, which is a continuation-in-part of applications Ser. No. 567,064, July 22, 1966, and Ser. No. 646,486, June 16, 1967, both now abandoned. This application July 31, 1970, Ser. No. 64,931
Int. Cl. A01n 9/36
U.S. Cl. 424—211                    5 Claims

ABSTRACT OF THE DISCLOSURE

Disclosed is the use of insecticides and acaricides of compounds of the formula:

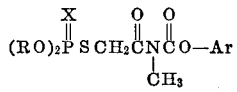

in which X is O or S, R is $CH_3$ or $C_2H_5$, and Ar is phenyl or substituted phenyl.

---

The application is a division of the copending application, Ser. No. 743,322, filed July 9, 1968, on which U.S. Patent 3,600,471 was granted, which is a continuation-in-part of the then copending application, Ser. No. 567,064, filed July 22, 1966, and now abandoned, and of the earlier copending application, Ser. No. 646,486, filed June 16, 1967, and now abandoned.

This invention relates to new compounds. More particularly, it relates to N-α-dialkoxyphosphino(mono- and di-)-thioacetyl-N-methylcarbamates of phenols and to their use as pesticides, including pesticidal compositions containing them.

The compounds of this invention may be broadly defined by the structural formula:

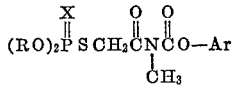

in which X represents O or S, R represents either a methyl or an ethyl radical, and Ar represents either a phenyl or a substitutedphenyl radical. More specifically, the compounds can be represented by the structural formula:

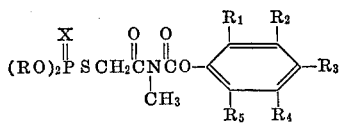

in which X represents O or S, R represents either a methyl or an ethyl radical, and $R_1$, $R_2$, $R_3$, $R_4$ and $R_5$ individually represent H, lower alkyl, alkenyl, alkoxy, alkenyloxy or carboalkoxy radicals, chloro, cyano or nitro groups. The phenyl ring may be substituted with more than one of such radicals or groups.

The term "lower alkyl" includes all alkyl groups containing from 1 to 5 carbon atoms, i.e., the methyl, ethyl, n-propyl, isopropyl, n-butyl, sec.-butyl, isobutyl, and t-butyl and the several amyl radicals, including the normal, secondary normal, primary iso, secondary iso and tertiary amyl radicals. Accordingly, the N-α-dialkoxyphosphinothioacetyl-N-methylcarbamates containing the following substituted-phenyl moieties are representative of pesticidally active compounds within the scope of the present invention; o-methylphenyl, m-methylphenyl, m-ethylphenyl, m-normalpropylphenyl, m-isopropylphenyl, m-normalbutylphenyl, m-secondarybutylphenyl, m-isobutylphenyl, m-tertiarybutylphenyl, 2-methyl-5-isopropylphenyl, 2-isopropyl-5-methylphenyl and the various m-amylphenyl moieties. The term "lower," pertaining to a carbon content of from 1 to 5 carbon atoms, is also applicable to the alkenyl, alkoxy and alkenyloxy radicals and to the alkyl group in the carboalkoxy radical.

While any of the methods which are known in the art or which would be obvious to one skilled in the art may be used to prepare the subject compounds, the method which is preferred comprises effecting reaction between the suitable phenyl N-chloroacetyl-N-methylcarbamate (the chloroacetyl carbamate having been prepared, for example, by effecting reaction between the corresponding phenyl N-methylcarbamate and chloroacetyl chloride) and an ammonium salt, a metal salt or an organic amine salt of a suitable thiophosphoric acid, preferably effecting such reaction in a solvent in which the salt employed is soluble. Such salts include, for example, the ammonium, potassium, sodium, pyridinium and triethylammonium salts of the thiophosphoric acid. In addition, free acids may be employed, in which case the reaction should be carried out in the presence of a catalyst, such as $ZnCl_2$ and $FeCl_3$.

The examples which follow will serve to illustrate the preferred methods for the preparation of the compounds which are the subject of this invention. Reference to Table No. 1 will indicate specific reactants, products and weights thereof involved. All parts specified are by weight.

EXAMPLE 1

Preparation of compounds

For all the compounds except No. 12, the solution formed by adding the suitable ammonium dialkyl phosphorothioate to the phenyl N-chloroacetyl-N-methylcarbamate in 79 parts of acetone (or acetonitrile) was refluxed for six hours, during which time a white ammonium chloride precipitate formed. The suspension was then cooled, poured into water and extracted with ether, the resulting ether solution thereupon being washed with sodium bicarbonate (5% aqueous solution) and water and then dried over anhydrous sodium sulfate. Upon removal of the ether solvent from the dried solution, at 18 mm. absolute pressure and a pot temperature which reached 80° C., and topping of the remaining residue, at 0.15 mm. absolute pressure and 80° C., a dark liquid product was obtained.

Compound No. 12 was prepared by a different procedure. To 5.4 parts of sodium methoxide in approximately 59 parts of ethanol was added 13.8 parts of diethylphosphite. After 15 minutes, 3.2 parts of sulfur was added to the reaction mixture. While the reaction mixture was being stirred, there then was added a solution of 27 parts of m-isopropylphenyl N-chloroacetyl-N-methylcarbamate in about 20 parts of ethanol, and the mixture was refluxed for four hours. The mixture was then filtered to remove the precipitated sodium chloride, and the filtrate was distilled at 18 mm. and 80° C. to remove the solvent. The residue was dissolved in ether, and the resulting solution was washed with water, then dried. The ether solvent was removed from the dried solution by distillation at 80° C. under 18 mm. pressure to obtain 33.5 parts of product.

TABLE NUMBER 1

Reactants

| Product Compound number | (RO)$_2$P(X)SNH$_4$ | | | | R$_1$ | R$_2$ | R$_3$ | R$_4$ | R$_5$ | Parts | Product analysis, percent | |
|---|---|---|---|---|---|---|---|---|---|---|---|---|
| | Parts | R= | X= | Parts | | | | | | | P | Cl[1] |
| 1 | 43 | CH$_3$ | S | 28.0 | H | CH$_3$ | H | H | H | 36.0 | 8.6 | 0.39 |
| 2 | 53.2 | C$_2$H$_5$ | S | 33.0 | H | CH$_3$ | H | H | H | 36.0 | 7.8 | Nil |
| 3 | 23.4 | CH$_3$ | S | 14.0 | H | iso-C$_3$H$_7$ | H | H | H | 20.0 | 7.8 | ---- |
| 4 | 20.0 | C$_2$H$_5$ | S | 12.0 | H | iso-C$_3$H$_7$ | H | H | H | 15.0 | 7.1 | ---- |
| 5 | 56.5 | CH$_3$ | S | 34.0 | H | t-C$_4$H$_9$ | H | H | H | 49.0 | 7.4 | 1.1 |
| 6 | 67.7 | C$_2$H$_5$ | S | 29.0 | H | t-C$_4$H$_9$ | H | H | H | 49.0 | 7.2 | 0.89 |
| 7 | 26.6 | CH$_3$ | S | 19.6 | H | CH$_3$ | H | H | iso-C$_3$H$_7$ | 29.1 | 7.9 | 1.7 |
| 8 | 64.0 | C$_2$H$_5$ | S | 36.6 | H | CH$_3$ | H | H | iso-C$_3$H$_7$ | 46.7 | 7.3 | 1.3 |
| 9 | 37.0 | CH$_3$ | S | 24.0 | H | iso-C$_3$H$_7$ | H | H | CH$_3$ | 35.0 | 7.7 | 1.8 |
| 10 | 47.0 | C$_2$H$_5$ | S | 28.0 | H | iso-C$_3$H$_7$ | H | H | CH$_3$ | 35.0 | 7.1 | 1.5 |
| 11 | 30.4 | CH$_3$ | O | 21.0 | H | iso-C$_3$H$_7$ | H | H | H | 34.0 | 5.6 | ---- |
| 12 | 33.5 | C$_2$H$_5$ | O | k 17.2 | H | iso-C$_3$H$_7$ | H | H | H | 27.0 | 6.6 | ---- |
| 13 | 28.0 | CH$_3$ | O | 21.0 | H | CH$_3$ | H | H | H | 30.0 | 6.9 | ---- |
| 14 | 34.0 | C$_2$H$_5$ | O | 20.0 | H | CH$_3$ | H | H | H | 24.0 | 8.6 | ---- |
| 15 | 34.2 | CH$_3$ | O | 16.0 | H | t-C$_4$H$_9$ | H | H | H | 36.0 | 4.5 | ---- |
| 16 | 36.0 | C$_2$H$_5$ | O | 21.0 | H | t-C$_4$H$_9$ | H | H | H | 25.0 | 8.1 | 0.28 |
| 17 | 44.0 | CH$_3$ | S | 28.0 | CH$_3$ | H | H | H | H | a 36.0 | 8.3 | 2.3 |
| 18 | 54.3 | C$_2$H$_5$ | S | 33.0 | CH$_3$ | H | H | H | H | b 36.0 | 8.3 | 1.3 |
| 19 | 9.5 | CH$_3$ | O | 8.0 | CH$_3$ | H | H | H | H | 13.0 | 6.6 | ---- |
| 20 | 58.0 | CH$_3$ | S | 37.1 | H | H | CH$_3$ | H | H | 47.1 | 8.2 | 3.8 |
| 21 | 78.5 | C$_2$H$_5$ | S | 50.0 | H | H | CH$_3$ | H | H | 54.0 | 7.9 | ---- |
| 22 | 32.2 | CH$_3$ | S | 19.0 | iso-C$_3$H$_7$ | H | H | H | H | 27.0 | 7.3 | 3.3 |
| 23 | 18.0 | C$_2$H$_5$ | O | 10.0 | H | iso-C$_3$H$_7$ | H | H | H | 14.0 | 7.2 | ---- |
| 24 | 48.0 | CH$_3$ | S | 29.0 | H | H | iso-C$_3$H$_7$ | H | H | 40.0 | 7.5 | 2.5 |
| 25 | 20.4 | C$_2$H$_5$ | S | 11.0 | H | H | iso-C$_3$H$_7$ | H | H | 14.0 | 7.3 | 1.3 |
| 26 | i 53.4 | CH$_3$ | S | 28.5 | H | C$_5$H$_{11}$ | H | H | H | c 48.0 | 6.4 | ---- |
| 27 | 43.2 | C$_2$H$_5$ | S | 22.0 | H | C$_5$H$_{11}$ | H | H | H | d 32.0 | 6.8 | ---- |
| 28 | 23.1 | CH$_3$ | S | 15.0 | CH$_3$O | H | H | H | H | 21.0 | 8.17 | ---- |
| 29 | 21.0 | C$_2$H$_5$ | S | 13.0 | CH$_3$O | H | H | H | H | 16.0 | 7.7 | ---- |
| 30 | 27.7 | CH$_3$ | S | 18.0 | H | CH$_3$O | H | H | H | 25.0 | 7.7 | ---- |
| 31 | 36.0 | C$_2$H$_5$ | S | 21.0 | H | CH$_3$O | H | H | H | 25.0 | 8.1 | 0.28 |
| 32 | 38.1 | C$_2$H$_5$ | S | 23.4 | H | H | CH$_3$O | H | H | 26.0 | 8.1 | 2.4 |
| 33 | 25.7 | CH$_3$ | S | 19.0 | H | H | CH$_3$O | H | H | 26.0 | 6.9 | ---- |
| 34 | 28.0 | CH$_3$ | S | 19.0 | iso-C$_3$H$_7$O— | H | H | H | H | 28.0 | 6.8 | 3.2 |
| 35 | 38.8 | C$_2$H$_5$ | S | 22.0 | iso-C$_3$H$_7$O— | H | H | H | H | 28.0 | 7.1 | ---- |
| 36 | 21.6 | CH$_3$ | S | 14.1 | H$_2$C=CHCH$_2$O— | H | H | H | H | 21.1 | 6.7 | 4.9 |
| 37 | 29.2 | C$_2$H$_5$ | S | 21.0 | CH$_2$=CHCH$_2$O— | H | H | H | H | 21.0 | 7.7 | 1.6 |
| 38 | 42.0 | CH$_3$ | S | 29.0 | Cl | H | H | H | H | 39.0 | 8.3 | 11.7 |
| 39 | 51.0 | C$_2$H$_5$ | S | 33.0 | Cl | H | H | H | H | 39.0 | 7.8 | 9.5 |
| 40 | i 12.0 | CH$_3$ | O | 8.0 | Cl | H | H | H | H | 12.0 | 6.2 | ---- |
| 41 | 34.7 | CH$_3$ | S | 21.8 | H | Cl | H | H | H | 30.0 | 8.0 | 9.8 |
| 42 | 42.1 | C$_2$H$_5$ | S | 25.2 | H | Cl | H | H | H | 30.0 | 7.7 | 8.4 |
| 43 | i 27.4 | CH$_3$ | S | 17.0 | H | H | Cl | H | H | 26.0 | 5.1 | ---- |
| 44 | 52.0 | CH$_3$ | S | 30.0 | Cl | H | H | iso-C$_3$H$_7$ | H | 45.0 | 6.6 | 10.9 |
| 45 | 28.0 | C$_2$H$_5$ | S | 16.0 | Cl | H | H | iso-C$_3$H$_7$ | H | 22.0 | 6.5 | 9.4 |
| 46 | 66.0 | CH$_3$ | S | 38.0 | Cl | H | H | t-C$_4$H$_9$ | H | e 62.0 | 6.7 | 10.6 |
| 47 | 84.0 | C$_2$H$_5$ | S | 42.0 | Cl | H | H | t-C$_4$H$_9$ | H | f 62.0 | 7.2 | 8.8 |
| 48 | i 28.0 | CH$_3$ | S | 19.0 | CH$_3$OC(O)— | H | H | H | H | 28.0 | 7.2 | ---- |
| 49 | 37.7 | C$_2$H$_5$ | S | 22.0 | CH$_3$OC(O)— | H | H | H | H | 28.0 | 6.7 | ---- |
| 50 | 26.2 | CH$_3$ | S | 19.0 | H | H | CN | H | H | g 25.0 | 8.0 | 3.2 |
| 51 | 33.1 | C$_2$H$_5$ | S | 22.0 | H | H | CN | H | H | h 25.0 | 8.3 | 2.1 |
| 52 | 24.0 | CH$_3$ | S | 29.0 | NO$_2$ | H | H | H | H | i 41.0 | 7.5 | 3.5 |
| 53 | 48.2 | C$_2$H$_5$ | S | 33.0 | NO$_2$ | H | H | H | H | j 41.0 | 7.4 | ---- |
| 54 | 15.0 | CH$_3$ | S | 12.7 | H | H | H | H | H | 15.2 | 7.0 | 4.0 |
| 55 | 30.0 | C$_2$H$_5$ | S | 21.0 | H | H | H | H | H | 20.0 | 8.8 | 1.8 |
| 56 | i 19.0 | CH$_3$ | O | 16.0 | H | H | H | H | H | 22.0 | 6.5 | ---- |
| 57 | 10.5 | CH$_3$ | O | 8.0 | H | C$_2$H$_5$ | H | H | H | 12.5 | 6.2 | ---- |
| 58 | i 32.3 | CH$_3$ | S | 18.0 | H | C$_2$H$_5$ | H | H | H | 24.0 | 8.0 | ---- |
| 59 | 38.1 | C$_2$H$_5$ | S | 21.0 | H | C$_2$H$_5$ | H | H | H | 24.0 | 7.9 | ---- |
| 60 | i 11.5 | CH$_3$ | O | 8.4 | H | C$_2$H$_5$O— | H | H | H | 12.5 | 5.7 | ---- |
| 61 | i 12.0 | CH$_3$ | S | 18.0 | H | C$_2$H$_5$O— | H | H | H | 27.0 | 5.7 | ---- |
| 62 | 35.5 | C$_2$H$_5$ | S | 21.0 | H | C$_2$H$_5$O— | H | H | H | 27.0 | 7.3 | ---- | a Percent N=3.47. b Percent N=3.23. c Percent N=2.59. d Percent N=2.47. e Percent N=2.61. f Percent N=2.52. g Percent N=6.28. h Percent N=5.6. i Percent N=6.11. j Percent N=5.79. k Sodium salt of diethylthiophosphoric acid. l Acetonitrile used as solvent instead of acetone.

The chemical structures of many of the preceding compounds were confirmed by infrared absorption analysis. Further purification of these compounds is possible by various methods, one of which is illustrated in the following example, in which the parts specified are by weight.

EXAMPLE 2

Purification of compounds

Seven parts of compound 3, which analyzed 7.8% P and 3.5% N, compared to theoretical values of 7.9% and 6.3% respectively for m-isopropylphenyl N-α-dimethoxyphosphinodithioacetyl-N-methylcarbamate, was refluxed with 99 parts of hexane. Thereafter, the hexane solution was decanted into 33 parts of hot hexane, leaving behind the small amount of sludge which formed. The solution was then cooled to 25° C. and decanted from the additional quantity of sludge produced. After 48 hours at 0 to 5° C., crystals formed. Decolorizing charcoal was added to a solution of these crystals in hot hexane, and, while still hot, the mixture was filtered. Three parts of white crystals, which formed upon standing overnight, were obtained from the filtrate; the crystals melted at 60–61° C.

The compounds prepared in accordance with the procedure of Example 1 were dispersed in water and used in a series of biological tests, the results of which demonstrate that these carbamates are toxic to a variety of undesirable pests. The dispersions were prepared by adding to solutions comprised of about equal parts of the carbamate toxicant, toluene, and "Tween 20" (a sorbitol monolaurate polyoxyethylene derivative), sufficient quantities of distilled water to result in aqueous dispersions of various toxicant concentrations.

The compounds tested varied in effectiveness against the specific pests subjected thereto. The data given in Table No. 2, which follows, show the levels of effectiveness of the subject compounds at various concentrations, the numerical values given being based on a 0–10 rating scale in which 0 means there was no effect and 10 indicated that the toxicant produced fatality in substantially all of the victims exposed to it.

all or most of the yellow fever mosquito larvae contacted therewith, and continued to kill mosquito larvae for two weeks. When, however, the two compounds were employed at 1 p.p.m., they continued to produce mortality in 100% of the larvae contacted therewith for a period in excess of two weeks. Compounds 26, 44, 46 and 47 also exhibited a high level of activity against mosquito larvae. In adult mosquito residual toxicity tests, compounds 3 and 4, which were applied to test surfaces in doses of 50 mg./sq. ft., continued to kill all of the adult mosquitoes contacted therewith for a significant time beyond the seven-week test periods. Compounds 5, 11, 12,

TABLE NUMBER 2

| Toxicant concentrations, percent | Housefly | | Mexican bean beetle | | | Pea aphid | | Southern armyworm | Two-spotted mite | | | Corn rootworm | | Pea aphid (systemic) | |
|---|---|---|---|---|---|---|---|---|---|---|---|---|---|---|---|
| | 0.05 | 0.025 | 0.1 | 0.01 | 0.005 | 0.05 | 0.01 | 0.1 | 0.1 | 0.0025 | 0.001 | 0.05 | 0.01 | 0.005 | 0.001 |
| Compound Number: | | | | | | | | | | | | | | | |
| 1 | 0 | | 10 | 8 | 7 | 10 | 10 | 0 | 0 | | | 10 | 0 | 8 | |
| 2 | 10 | 1 | 10 | | | 10 | | 0 | 0 | | | 3+ | | 0 | |
| 3 | 10 | 10 | | 7 | 2 | 10 | | 9 | 10 | 10 | | | 6 | | 8 |
| 4 | 6 | 1 | | 3 | 0 | 10 | 4 | 9 | 8+ | 1+ | | | 8 | | |
| 5 | 10 | 9+ | 10 | | 9 | 10 | | 2 | 0 | | | 10 | 0 | 0 | |
| 6 | 0 | | 10 | 10 | 9 | 5 | | 0 | 0 | | | 10 | 0 | 3 | |
| 7 | 9+ | | 8 | | | 10 | | 1 | 0 | | | 0 | | 0 | |
| 8 | 8 | | 3 | | | 10 | | 0 | 0 | | | 0 | | 0 | |
| 9 | 10 | | | 6 | | 10 | | | | | 0 | 0 | | 0 | |
| 10 | 10 | | | 0 | | 10 | | | | | 0 | 0 | | 8 | |
| 11 | 10 | | 10 | | | | 8 | 6 | 10 | | | 10 | | 0 | |
| 12 | 2+ | | 10 | 10 | 2+ | 10 | 8 | 0 | 10 | | | | 7 | 6 | 6 |
| 13 | 8 | | 5 | | | | 10 | 0 | 10 | | | 6 | | 10 | |
| 14 | 0 | | 10 | | | | 10 | 0 | 10 | | | 6 | | 10 | |
| 15 | 10 | | 10 | | | | 0 | 0 | 10 | | | 6 | | 8 | |
| 16 | 8 | | 10 | | | | 0 | 0 | 6 | | | 6 | | 0 | |
| 17 | 6 | | 0 | | | 10 | | 0 | 9 | | | 0 | | 10 | 10 |
| 18 | 2 | | 0 | | | 10 | | 0 | 10 | | | 0 | | 10 | 10 |
| 19 | 2 | | 10 | | 10 | | 0 | 0 | 8 | | | | | | |
| 20 | 10 | 9+ | 4 | | | 10 | | 0 | 8 | | | 0 | | 8 | 10 |
| 21 | 4 | | 10 | 2 | 0 | 10 | | 0 | 6 | | | 0 | | 7 | |
| 22 | 10 | 10 | 10 | 8 | 10 | | 0 | 0 | 4 | | | 0 | | 0 | |
| 23 | 5 | 3 | 10 | 10 | 2 | 10 | 8 | 0 | 10 | | | | | | |
| 24 | 10 | 10 | 10 | 1 | 0 | | 0 | 0 | 10 | | | 8 | | 10 | |
| 25 | 8 | | 3 | | | | 0 | 0 | 10 | | | 0 | | 0 | |
| 26 | 10 | 8+ | 10 | 10 | 10 | | 0 | 0 | 0 | | | 10 | 6 | 10 | 5 |
| 27 | 6+ | | 10 | | | | 0 | 8 | 0 | | | 4 | | 10 | |
| 28 | | | 8 | | | | 0 | 0 | 10 | | | 2 | | 10 | |
| 29 | 0 | | | 10 | | | 0 | 0 | 4 | | | 0 | | 8 | |
| 30 | 10 | | 9 | | | | 0 | 8 | 10 | | | 0 | | 10 | |
| 31 | 7+ | | 10 | 10 | 10 | | 0 | 0 | 10 | | | 0 | | 10 | 10 |
| 32 | 0 | | 0 | | | | 0 | 0 | 10 | | | 0 | | 10 | |
| 33 | 10 | 9+ | 3 | | | | 0 | 0 | 10 | | | 0 | | 10 | |
| 34 | 10 | | 10 | | | | 0 | 0 | 8 | | | 0 | | 8 | |
| 35 | 2 | | 0 | | | | 0 | 0 | 10 | | | 0 | | 0 | |
| 36 | 10 | 0 | 10 | 8 | | 10 | | 0 | 0 | | | | | 10 | 8 |
| 37 | 6 | | 10 | | | | 0 | 0 | 6 | | | 8 | | 0 | |
| 38 | 10 | 7 | 3 | | | 10 | 8 | 0 | 10 | | | 3+ | | 10 | 10 |
| 39 | 9+ | 0 | 4 | | | 10 | 6 | 0 | 0 | | | 10 | 0 | 10 | 10 |
| 40 | 10 | 10 | 10 | | 10 | | 0 | 0 | 10 | | | 6 | | 10 | 10 |
| 41 | 10 | | 10 | 0 | 0 | 10 | 10 | 0 | 0 | | | 0 | | 5 | |
| 42 | 8 | 2 | 0 | | | 10 | 10 | 0 | 10 | 8 | 1 | 0 | | 4 | |
| 43 | 6 | | 10 | | | | 4 | 0 | 8 | | | 0 | | 10 | |
| 44 | 8 | | 10 | 8 | 1 | | 0 | 0 | 10 | | | 8 | | 0 | |
| 45 | 0 | | 10 | | | | 0 | 6 | 6 | | | 0 | | 0 | |
| 46 | 8+ | 4 | 10 | 8 | 9 | 10 | | 0 | 0 | | | 6 | | 10 | 8 |
| 47 | 8 | 2 | 10 | 7 | 0 | 8 | | | 0 | | | 6 | | 10 | 1 |
| 48 | 10 | 2+ | 7 | | | | 0 | 0 | 0 | | | 0 | | 10 | |
| 49 | 2+ | | 9 | | | | 0 | 0+ | 0 | | | 6 | | 7 | |
| 50 | 8+ | | 0 | | | | 0 | 0 | 10 | | | 0 | | 10 | |
| 51 | 4 | | 7 | | | | 0 | 0 | 10 | | | 2 | | 8 | |
| 52 | 10 | 8 | 5 | | | 10 | | 0 | 10 | | | 0 | | 10 | 10 |
| 53 | 4 | | 10 | | | 10 | 5 | 10 | 8 | | | 0 | | 8 | |
| 54 | 10 | 4 | 7 | | | 10 | | 0 | 0 | | | | | 10 | 10 |
| 55 | 6 | | 10 | | | | 0 | 0 | 10 | | | 0 | | 8 | |
| 56 | 10 | 10 | 10 | | 10 | | 9 | 0 | 10 | | | 0 | | 10 | 10 |
| 57 | 10 | 9+ | 10 | | 10 | | 9 | 0 | 10 | | | 0 | | 10 | 10 |
| 58 | 10 | 9 | 10 | | 0 | | 0 | 0 | 10 | | | | | | |
| 59 | 8 | | 9 | | | | 0 | 0 | 10 | | | | | | |
| 60 | 10 | 8+ | 10 | | 10 | | 10 | 0 | 10 | | | 0 | | 10 | 10 |
| 61 | 9+ | | 9 | 0 | | | 0 | 0 | 8 | | | | | | |
| 62 | 4 | | 10 | | 4 | | 0 | 0 | 9 | | | | | | |

In addition to the above-indicated activities, compounds 3 and 4 have been found to be very effective in combatting mosquitoes. They produce high mortality in both the adult and the larval form of that insect. At a concentration of 0.1 p.p.m., both compounds killed either 15, 16, 22, 23 and 44 also were outstandingly effective against adult mosquitoes, and compounds 6, 13 and 14 exhibited fair activity against that insect. Thus, the excellent toxicity of these compounds to adult and larval mosquitoes is demonstrated.

It has also been found that compounds 3 and 4 in particular may be employed, to excellent advantage, as miticides. Two methods were used to test this property, one being for initial and the other for residual toxicity; *Tetranychus bimaculatus* (two-spotted spider mite) was used as the test mite in both methods.

Test formulations were prepared by dissolving one gram of the toxicant in one to three milliliters of toluene to which one milliliter of Tween 20 was added. From the resulting solution aqueous emulsions of desired toxicant concentrations were prepared by adding the required amounts of distilled water thereto. Less concentrated emulsions were also, in some instances, prepared by starting with less toxicant and adding toluene and Tween 20 in the proportions indicated above.

The method employed for testing initial toxicity involves the infestation of lima bean seedlings (Wood's Prolific) with approximately 50 mites in various stages of growth. An emulsion containing the candidate material at the desired concentration was sprayed onto both sides of the infested primary leaves in an amount sufficient to cause run-off of the liquid to commence. The stem of the seedling was thereupon placed in a water-filled culture tube. The number and percentage of mites dead or moribund were noted and recorded at the end of a six-day holding period. Carefully controlled conditions of temperature and humidity were maintained during mite rearing and throughout the test. The subject compounds were tested in the above manner at concentrations of 10 to 25 p.p.m. Compound 3 killed all of the mites exposed at each toxicant concentration. At the higher concentration, compound 4 killed 80-90% of the mites exposed; the percent killed dropped to 10-20% at the 10 p.p.m. level of toxicant.

In carrying out the test for residual toxicity, seven to ten day-old lima bean seedlings were sprayed with emulsions containing a candidate compound, at a desired concentration, in the manner described above for the initial toxicity tests. The treated plants were thereafter infested by placing bean leaves, supporting mite colonies, onto the sprayed leaves, infestation with fresh colonies of mites occuring one hour, six days and 14 days after spraying of the plants. A holding period of about six or more days was usually allowed following infestation, after which the plants were inspected and data on the total mite population were recorded. Tests were performed using the compounds in concentrations of 0.25%, 0.1% and 0.05%. Under all conditions of toxicant concentration and mite infestation employed, compound 3 gave invariably excellent results, killing 100% of the mites subjected in the test in every instance. Compound 4 gave only slightly less excellent results, killing 100% of the mites subjected in the test in every instance. Compound 4 gave only slightly less excellent results, killing 100% of the mites contacted in every test except the most extreme. In that test, in which a 0.05% concentration of toxicant was used and infestation of mites occurred 14 days after spraying of the plants, mortality was produced in about 90% of the mites subjected to the treated plants. Thus, compounds 3 and 4 have been found to be excellent miticides.

Many of the compounds of this invention also have been found to act effectively as plant systemic insecticides. Two tests were used to demonstrate this property. In one of these, peas and lima beans were planted, after which the compound in the form of a dust formulation containing 10% by weight of the compound was applied to the soil. The rate of application used provided for one pound of the compound per acre. The plants emerged five days later and were infected at intervals, the pea plants with pea aphids and the beans with two-spotted mites.

Using this procedure it was found that compounds Nos. 3, 12, 13, 14, 17, 20, 28, 33, 52 and 54 were 100% effective (no nymphs) for as long as two weeks against the pea aphid. Against the two-spotted mite, compounds Nos. 12, 13, 17, 52 and 54 were 95-100% effective for as long as two weeks; compounds Nos. 3, 20, 28 and 33 were in the range of 80-90% effective.

The other test for plant systemic activity was similar to the first except that the 10% dust was applied in the furrow along with the seeds and the rate was such as to provide one-half pound of the compound per acre. Compounds Nos. 3, 12, 13, 14, 15, 17, 19, 20, 24, 26, 27, 28, 29, 30, 31, 32, 33, 34, 36, 39, 40, 43, 46, 48, 50, 52, 54, 56, 57, 58, 59, 60, 61 and 62 were 100% effective for as long as two weeks against the pea aphid. Against the two-spotted mite, compounds Nos. 3, 13, 19, 52, 54, 56, 57, 60 and 62 were 80/100% effective for as long as two weeks. Some of the other compounds evaluated in this test were in the same range of effectiveness up to one week's time, but decreased in effectiveness during the second week.

An outstanding property of many of the instant compounds is their high degree of suitability for use as animal systemic insecticides. To be suitable for such a use, a compound administered internally should be capable of killing parasite insects without causing harm to the host animal. Thus, the compound should not be injurious to the animal in the dosages which are toxic to the insects.

Three tests were used to demonstrate this most beneficial characteristic of the subject compounds. The first test, used primarily merely to indicate positive or negative systemic activity, involves oral administration of the compound to be tested to guinea pigs, the compound being dissolved in polyethylene glycol 200 (a water-soluble liquid polymer exhibiting no definite freezing point and a specific gravity of 1.12). On the day prior to dosing, *Lucilia sericata* (maggotfly) larvae are introduced into wounds artificially produced on the guinea pigs. The larvae are then observed for both toxic and lethal effects at suitable time intervals after the pigs are dosed, the observation period being from 30 minutes to six hours after dosing. This test indicated positive systemic activity for a majority of the compounds tested.

In the second test, a host animal is orally dosed with a solution of the test compound dissolved in polyethylene glycol 200 and exposed, at suitable time intervals after dosing, to starved *Stomoxys calcitrans* (stable flies). The host animals used to test certain of the toxicants were mice; for the other toxicants guinea pigs were used. In these tests, the host animals were dosed with the candidate toxicant at two levels of concentration, i.e., 10 and 25 mg. of toxicant per kg. of body weight. Fresh groups of flies were exposed to the hosts at one- and three-hour intervals after dosing. The data in the table which follows, Table No. 3, indicate with particularity the degrees of effectiveness of the test compounds as animal systemic against stable flies. These degrees of effectiveness are expressed in terms of a 0-10 rating scale, 0 indicating that there was no effect, and 10 indicating kill of substantially all the flies exposed to the hosts.

TABLE NO. 3

| Exposure interval (hours after dosing) | Toxicant concentration (mg./kg.) | | | |
|---|---|---|---|---|
| | 25 | | 10 | |
| | 1 | 3 | 1 | 3 |
| Compound number; | | | | |
| 1 | 10 | | 10 | 6 |
| 2 | 10 | | 10 | 10 |
| 3 | 10 | 10 | 10 | 4+ |
| 4 | 10 | 10 | 6+ | 0 |
| 5 | 7 | 1+ | | |
| 6 | 10 | | 10 | 0 |
| 7 | 10 | 10 | 0 | 0 |
| 8 | 10 | 10 | 10 | 9 |
| 9 | 10 | | | 4 |
| 10 | 10 | 10 | 7 | 0 |
| 17 | 10 | 10 | 10 | 0 |

Additional compounds having a rating of 10 under all of the conditions specified in Table No. 3 were compounds Nos. 15, 20, 24, 33, 34, 35, 39 and 54. Other compounds having a rating of 10 at the 25 mg./kg. concentration were compounds Nos. 11, 12, 13, 14, 16, 22, 25, 30, 36, 38, 42, 46, 51 and 52.

As a further indication of the suitability of the subject compounds for use as systemic insecticides, a third test was carried out comparing the activity of compound 3 with that of a standard systemic insecticide, i.e., dimethyl-(2,2,2-trichloro-1-hydroxyethyl)-phosphate. The test involved noting the time during which blood from mice dosed with a quantity of either of the compounds continued to kill more than 70% of the stable flies fed thereon. At the lowest dosage concentration employed, 5 mg./kg., the standard compound produced no mortality; compound 3 produced greater than 70% mortality for approximately 1½ hours. At a dose rate of 50 mg./kg., the highest rate used, the blood containing compound 3 remained fatal to more than 70% of the flies for about 6¾ hours; effectiveness of the standard toxicant diminished to less than 70% after 2½ hours.

The excellent results realized in the tests outlined demonstrate that many of these compounds are exceptionally valuable animal systemic insecticides. As is pointed out above, it is important that such an insecticide be fairly innocuous to the host animal, that is, that the insecticide have a relatively low mammalian toxicity. Acute oral toxicity to white rats, often expressed in terms of $LD_{50}$ values, is a measure of such toxicity. The $LD_{50}$ value assigned to a compound expresses the amount of that compound, in mg. per kg. of body weight, which will be a lethal dose to 50% of the animals tested, a high $LD_{50}$ value indicating a low (favorable) mammalian toxicity, since a large dose is required to produce 50% fatality. The approximate $LD_{50}$ values of some of the instant compounds, and of DDT, for the sake of comparison, are presented in the following table:

TABLE NO. 4

| Compound: | $LD_{50}$ value |
|---|---|
| 1 | 400 |
| 2 | 100 |
| 3 | 400 |
| 4 | 158 |
| 5 | 200 |
| 6 | 200 |
| 7 | 400 |
| 8 | 50 |
| 9 | 400 |
| 10 | 400 |
| DDT | 113 |

By comparison with DDT, it will be seen that most of the above compounds are well-suited for internal administration to mammals, particularly compounds 1, 3, 7 and 9. While the other compounds are more toxic to mammals, it is possible to prepare formulations containing these compounds in concentrations low enough to be innocuous to the mammal to which they are administered, and yet high enough to be outstandingly effective against its parasites. Thus, compound 8, for example, is the most toxic to mammals of the compounds listed above; referring to Table No. 3, however, it is seen that the same compound is also one of the two most active systemics. Accordingly, proper formulation of that compound will minimize its mammalian toxicity and yet not eliminate it from use as a valuable systemic insecticide.

Each of the compounds of the present invention may be employed in pesticidal formulations as the sole toxicant thereof. Alternatively, however, properties of these compounds may be modified by employing two or more of them together or by employing them in admixture with toxicants such as toxaphene, DDT, Thanite, Chlordane, rotenone, pyrethrum, Sevin, Thiodan and Malathion.

The present compounds are suitable for application according to any of the methods commonly used for pesticides, for example, as solvent solutions or in combination with solid or liquid extenders or adjuvants. Suitable solvents for the preparation of solvent solutions, which may either be used directly or after dispersion in an immiscible liquid or on a solid carrier, include acetone, methyl ethyl ketone, diacetone alcohol, isophorone, isopropanol, hydrocarbon solvents such as benzene, toluene, xylene, and other similar organic solvents. When such a solvent solution is to be used directly as an ordinary spray, the concentration of toxicant contained therein may range from about 0.01% to about 10%, based on the weight of the solution. When employed as a low-volume spray, the toxicant may be applied without dilution or diluted with the minimum amount of solvent necessary to achieve a solution of suitable viscosity for spraying. Otherwise, the toxicant concentration in solution will be adjusted so that upon further dilution the desired ultimate concentration results. Amounts of toxicant ranging from about 0.01% to about 10% by weight of the diluted formulation have generally been found to be suitable. An example of an application in which a solvent solution can be used directly is where the toxicant is employed in an aerosol formulation, in which case difluorodichloromethane or a similar aerosol propellant functions both as the solvent and as the propellant vehicle.

In many instances it will be most advantageous, for such reasons as economy and facility of application, to employ these pesticides in admixture with solid or non-solvent liquid extenders. Such extenders include water and solid carrier materials, preferably those that are readily available and inexpensive, such as talc, attapulgite, natural clays, pyrophylite, diatomaceous earth, kaolin, aluminum and magnesium silicates, montmorillonite, and similar substances such as are used as carriers in the pesticide and herbicide arts. Using such solid materials as extenders, wettable powders and dusts may be formulated. In many instances, the extenders envisioned for use in this invention will themselves possess surface-active properties, in which case they may properly be termed dispersants. In other instances, such as when water is used, the extender possesses no surface-active properties of its own, and an additional material will be added to aid in the dispersion of the toxicant throughout the extender. It should be realized that while it is generally advantageous to distribute as uniformly as possible the toxic substances over surfaces to which the pesticides are applied, through the use of surface-active agents when necessary, there may be circumstances under which it is desired to omit such agents; such cases are also intended to be within the scope of this invention. Toxicant concentrations in these extended formulations may vary within wide limits; suitable concentrations for application in the field range from about 0.01% to about 25% of toxicant based on the total weight of formulation.

The aqueous dispersions contemplated herein comprise a compound of this invention, water and a surface-active dispersing agent. Ordinarily, an aqueous dispersion will be made up from a concentrate comprised of the toxic compound and a surface-active agent, which concentrate will subsequently be dispersed in water to a desired concentration. The amount of toxic compound contained in a spray properly diluted for application in the field will generally range from about 0.01% to about 10% of such an aqueous dispersion. In most instances, the amount of surface-active agent used will be from about 0.01 to about 2 times the amount of toxicant present. Organic solvents may also be contained in the concentrate to aid in effective dispersion.

Suitable surface-active dispersing agents for use in the compositions of this invention are those disclosed in Chemistry of Insecticides, Fungicides, and Herbicides (Donald E. H. Frear, Second Edition (1948), pp. 280–287) for use with known insecticides. They include neutral soaps of resin, alginic and fatty acids, with alkali metals, alkyl amines or ammonia, saponins, gelatins, milk, soluble casein, flour and soluble proteins thereof, sulfite lye, lignin pitch, sulfite liquor, long-chain fatty alcohols having 12–18 carbon atoms and alkali metal salts of the sulfates thereof, salts of sulfated fatty acids, salts of sulfonic acids, esters of long-chain fatty acids and polyhydric alcohols in which alcohol groups are free, solid dispersants such as fuller's earth, china clay, kaolin, attapulgite, and bentonite and related hydrated aluminum silicates having the property of forming a colloidal gel. Among the other surface-active dispersing agents which are useful in the compositions of this invention are the omega-substituted polyethylene glycols of relatively long chain length, particularly those in which the omega substituent is aryl, alkyl, or acyl.

Compositions of the toxic material and surface-active dispersing agent will in some instances have more than one surface-active dispersing agent for a particular type of utility. For example, the toxic formulation may contain surface-active clay as the sole adjuvant or clay and another surface-active dispersing agent to augment the dispersing action of the clay. Similarly, as is hereinbefore described, the toxicant may have water admixed therewith along with a surface-active dispersing agent, most often the amount of water added being sufficient to form an emulsion. All of these compositions comprising the toxic compound and surface-active dispersing agents may contain, in addition, synergists and/or adhesive or sticking agents. Moreover, the recital of specific classes of additives is not intended to limit the scope of this invention thereto, but it is to be understood that the addition of other materials to these formulations is also envisioned.

In using a toxicant of this invention for killing pests, the compound acts by contact therewith, which contact may be made by direct and/or indirect means. Direct contact may be effected, for example, by a spraying of the pests themselves. Indirect contact may be made, for example, by application of the toxicant to habitats of the pests or by internal administration of the toxic material to host animals of which the pests are parasites.

What I claim and desire to protect by Letters Patent is:

1. An insecticidal or acaricidal composition that comprises a solution consisting essentially of (1) an effective quantity of material selected from the group of compounds represented by the structural formula:

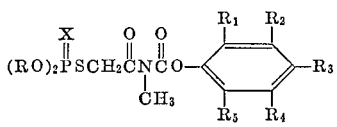

in which X is selected from the group consisting of O and S, R is a radical selected from the group consisting of $CH_3$ and $C_2H_5$, and $R_1$, $R_2$, $R_3$, $R_4$ and $R_5$ are individually selected from the group consisting of H, lower alkyl, alkenyl, alkoxy, alkenyloxy, carboalkoxy, chloro, cyano and nitro, and (2) a solvent for said material.

2. Insecticidal or acaricidal composition according to claim 1 in which said solution comprises a surface-active agent.

3. An insecticidal or acaricidal composition according to claim 2 which comprises water, and which is in the form of an emulsion.

4. An insecticidal or acaricidal composition consisting essentially of an effective quantity of material selected from the group of compounds represented by the structural formula:

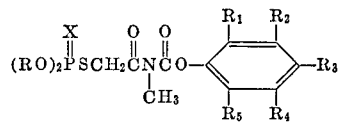

in which X is selected from the group consisting of O and S, R is selected from the group consisting of $CH_3$ and $C_2H_5$, and $R_1$, $R_2$, $R_3$, $R_4$ and $R_5$ are individually selected from the group consisting of H, lower alkyl, alkenyl, alkoxy, alkenyloxy, carboalkoxy, chloro, cyano and nitro, and solid carrier material.

5. A method of killing insects and acarides, which comprises contacting said pests with an effective quantity of material selected from the group of compounds represented by the structural formula:

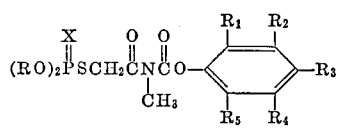

in which X is selected from the group consisting of O and S, R is a radical selected from the group consisting of $CH_3$ and $C_2H_5$, and $R_1$, $R_2$, $R_3$, $R_4$ and $R_5$ are individually selected from the group consisting of H, lower alkyl, alkenyl, alkoxy, alkenyloxy, carboalkoxy, chloro, cyano and nitro.

References Cited
UNITED STATES PATENTS
3,472,933  10/1969  Rohr _____ 424—211

SAM ROSEN, Primary Examiner